US006623263B2

(12) United States Patent
Faiman et al.

(10) Patent No.: US 6,623,263 B2
(45) Date of Patent: Sep. 23, 2003

(54) POWDER COMPACTING PRESS WITH VARIABLE FREQUENCY DRIVE

(75) Inventors: Paul G. Faiman, Southgate, MI (US); Bruce A. Wagner, New Boston, MI (US)

(73) Assignee: PTX-Pentronix, Inc., Lincoln Park, MI (US)

(*) Notice: Subject to any disclaimer, the term of this patent is extended or adjusted under 35 U.S.C. 154(b) by 183 days.

(21) Appl. No.: 09/851,178

(22) Filed: Sep. 4, 2001

(65) Prior Publication Data

US 2002/0009512 A1 Jan. 24, 2002

Related U.S. Application Data

(60) Provisional application No. 60/202,725, filed on May 8, 2000.

(51) Int. Cl.[7] ........ B29C 43/58

(52) U.S. Cl. ........ 425/73; 425/78; 425/135; 425/258; 425/422

(58) Field of Search ........ 425/78, 135, 151, 425/258, 352, 73, 422

(56) References Cited

U.S. PATENT DOCUMENTS 3,574,892 A * 4/1971 Smith ........ 425/78
3,645,658 A * 2/1972 DeTroyer ........ 425/78
3,826,599 A 7/1974 DeSantis et al. ........ 425/78
4,047,864 A 9/1977 DeSantis ........ 425/78
4,061,452 A 12/1977 DeSantis ........ 425/78
4,061,453 A 12/1977 DeSantis ........ 425/78
4,153,399 A 5/1979 DeSantis ........ 425/78
4,166,716 A 9/1979 DeSantis ........ 425/78
4,230,653 A 10/1980 DeSantis ........ 264/39
4,298,563 A 11/1981 DeSantis et al. ........ 264/111
4,302,412 A 11/1981 DeSantis ........ 264/109
4,347,051 A 8/1982 DeSantis ........ 425/78
4,376,744 A 3/1983 DeSantis ........ 264/106
4,377,376 A 3/1983 DeSantis ........ 425/78
4,390,335 A 6/1983 DeSantis et al. ........ 425/78
4,401,614 A 8/1983 DeSantis ........ 264/109
4,411,848 A 10/1983 DeSantis ........ 264/40.5
4,424,185 A * 1/1984 DeSantis et al. ........ 425/139
4,427,352 A 1/1984 DeSantis et al. ........ 425/78
4,450,127 A 5/1984 DeSantis et al. ........ 264/56
4,456,445 A 6/1984 DeSantis et al. ........ 425/78
4,573,895 A 3/1986 DeSantis et al. ........ 425/78

* cited by examiner

*Primary Examiner*—Robert Davis
*Assistant Examiner*—Thu Khanh T. Nguyen
(74) *Attorney, Agent, or Firm*—Gifford, Krass, Groh, Sprinkle, Anderson & Citkowski, P.C

(57) ABSTRACT

A variable speed powder compacting press includes a generally horizontal table with a powder compacting die cavity defined in the table. A movable compacting punch is disposed in the die cavity and can move upwardly towards the die cavity opening to compact powder disposed in the cavity. A sliding anvil is disposed on the horizontal table and has a powder dispensing portion, a compacting portion, and a pick up portion. The anvil is movable between a filling position wherein the dispensing portion is above the cavity, a compacting position wherein the compacting portion is above the cavity, and a pick up position wherein the pick up position is above the cavity. A rotary drive operates to move the compacting punch and the sliding anvil in a coordinated manner. A safety cover can cover a portion of the table and the sliding anvil during operation of the machine. An interlock determines if the safety cover is in a closed position. A variable frequency drive controller operates to control the rotational speed of the rotary drive and is in communication with the interlock.

9 Claims, 4 Drawing Sheets

FIG - 3
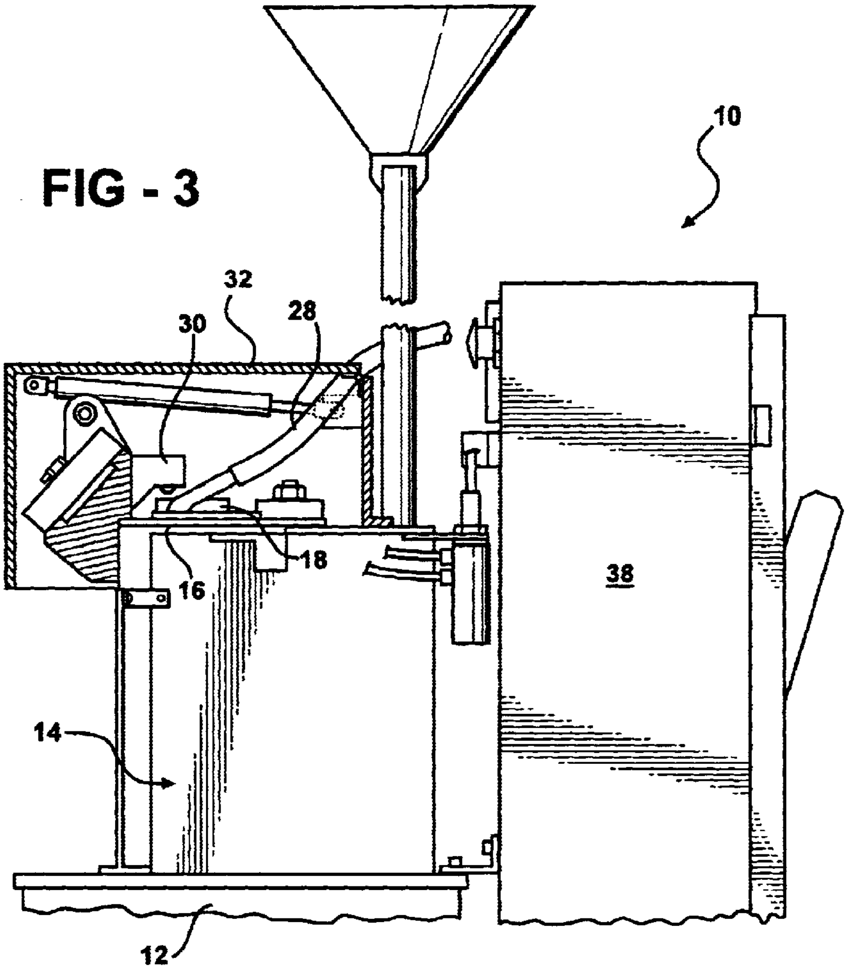
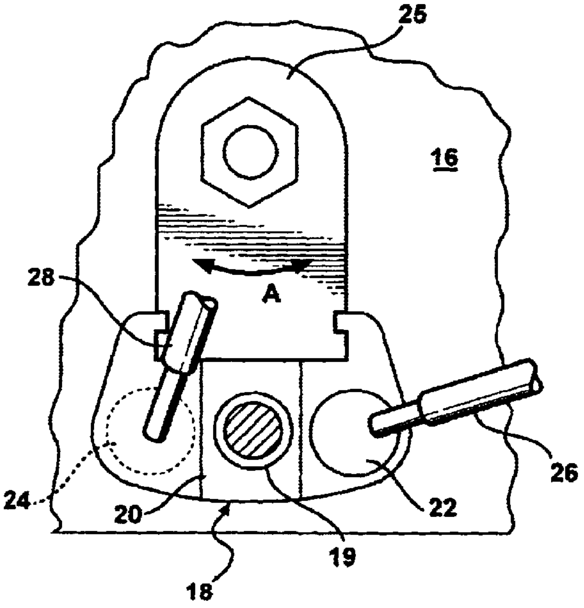
FIG - 4

POWDER COMPACTING PRESS WITH VARIABLE FREQUENCY DRIVE

REFERENCE TO RELATED APPLICATION

This application claims priority from U.S. provisional application Ser. No. 60/202,725, filed May 8, 2000, the entire contents of which are incorporated herein by reference.

FILED OF THE INVENTION

The present invention is generally directed toward a powder compacting press and, more specifically, to a powder compacting press with a variable speed drive.

BACKGROUND OF THE INVENTION

The present invention is directed to an improvement on powder compacting presses. Examples of powder compacting presses are disclosed in Applicant's following issued U.S. Pat. Nos: 3,826,599; 4,047,864; 4,053,267; 4,061,452; 4,061,453; 4,153,399; 4,166,716; 4,230,653; 4,298,563; 4,302,412; 4,347,051; 4,376,744; 4,377,376; 4,390,335; 4,401,614; 4,411,848; 4,427,352; 4,450,127; 4,456,445; and 4,573,895.

In the powder-compacting presses disclosed in the aforementioned patents, powder such as metallic or ceramic powder is compacted and formed in a single or multi-cavity die. The presses tend to be somewhat complicated, including punch and die sets, automatic powder filling means, ejection means, and a heavy duty mechanism designed to move one or more compressing members so as to compress powder trapped in a cavity. All operations of the press are typically controlled by one or more rotary cam shafts which are driven by an electric motor. As a cam shaft rotates, a filling means is moved into place over the cavity. The cavity is either already open and powder fills it, or the cavity is opened up to draw powder into the cavity. An anvil is then moved into place over the cavity, and a compressing member is moved so as to compress the powder in the cavity. The anvil then moves out of the way and the compacted product is ejected or removed from the cavity. This process is repeated to create multiple parts.

In setting up and using a powder compacting press, it is often necessary to slowly move the rotational cam shafts so as to slowly move the machine through its operations. For this purpose, many of the machines typically include a removable hand crank that allows an operator to manually rotate the drive means of the press forwardly and backwardly by small amounts and at a slow rate. The traditional drive motors have not been capable of slowly and controllably moving the cams forwardly and backwardly. In fact, reversing the drive means was inconvenient or impossible. As will be clear to those of skill in the art, the use of a hand crank presented safety concerns. A user could catch their hand or other item on the crank when the electric drive means is operated. Also, manually rotating the hand crank is both slow and tiring. In light of the above, there is a need for an improved powder compacting press which allows for fine control of the press without the need for manual hand cranking.

SUMMARY OF THE INVENTION

The present invention improves on the prior art by providing a variable speed powder compacting press. The press includes a generally horizontal table with a powder compacting die cavity defined in the table. The cavity has an upwardly facing opening. A movable compacting punch is disposed in the die cavity and can move upwardly towards the die cavity opening to compact powder disposed in the cavity. A sliding anvil is disposed on the horizontal table and has a powder dispensing portion, a compacting portion, and a pick up portion. The anvil is movable between a filling position wherein the dispensing portion is above the cavity, a compacting position wherein the compacting portion is above the cavity, and a pick up position wherein the pick up portion is above the cavity. A rotary drive operates to move the compacting punch and the sliding anvil in a coordinated manner. A safety cover can cover a portion of the table and the sliding anvil during operation of the machine and interlock determines if the safety cover is in a closed position. A variable frequency drive controller operates to control the rotational speed of the rotary drive and is in communication with the interlock. The drive control has a control panel including a mode control, a run control, a direction control, and a speed control. The drive control has a run mode and a set up mode that are selectable using the mode control. When the drive control is in the run mode, the run control operates to cause the rotary drive to continuously rotate at a rotational speed in a first range of speeds only when the interlock indicates that the safety cover is closed. The run control requires only a single manipulation to cause continuous rotation. While in the run mode, the speed control operates to increase or decrease the rotational speed of the rotary drive within the first range of speeds. When the drive control is in the set up mode, the run control operates to cause the rotary drive to rotate at a second speed that is less than the first range of speeds but does so only while the run control is manipulated. The rotary drive stops when the run control is released. Therefore, the rotary drive may be jogged. The run control is operable to cause rotation of the rotary drive when the interlock indicates the safety control is closed as well as when the interlock does not indicate that the safety cover is closed. While in the set up mode, the direction control is operable to control the direction of rotation of the rotary drive.

BRIEF DESCRIPTION OF THE DRAWINGS

The present invention will be described with reference to the following Figures.

FIG. 3 is a side elevational view of the press of FIGS. 1 and 2 with the cover partially cut away to show the sliding anvil;

FIG. 4 is a top plan view of the sliding anvil;

DETAILED DESCRIPTION OF THE PREFERRED EMBODIMENTS

Figure 1:
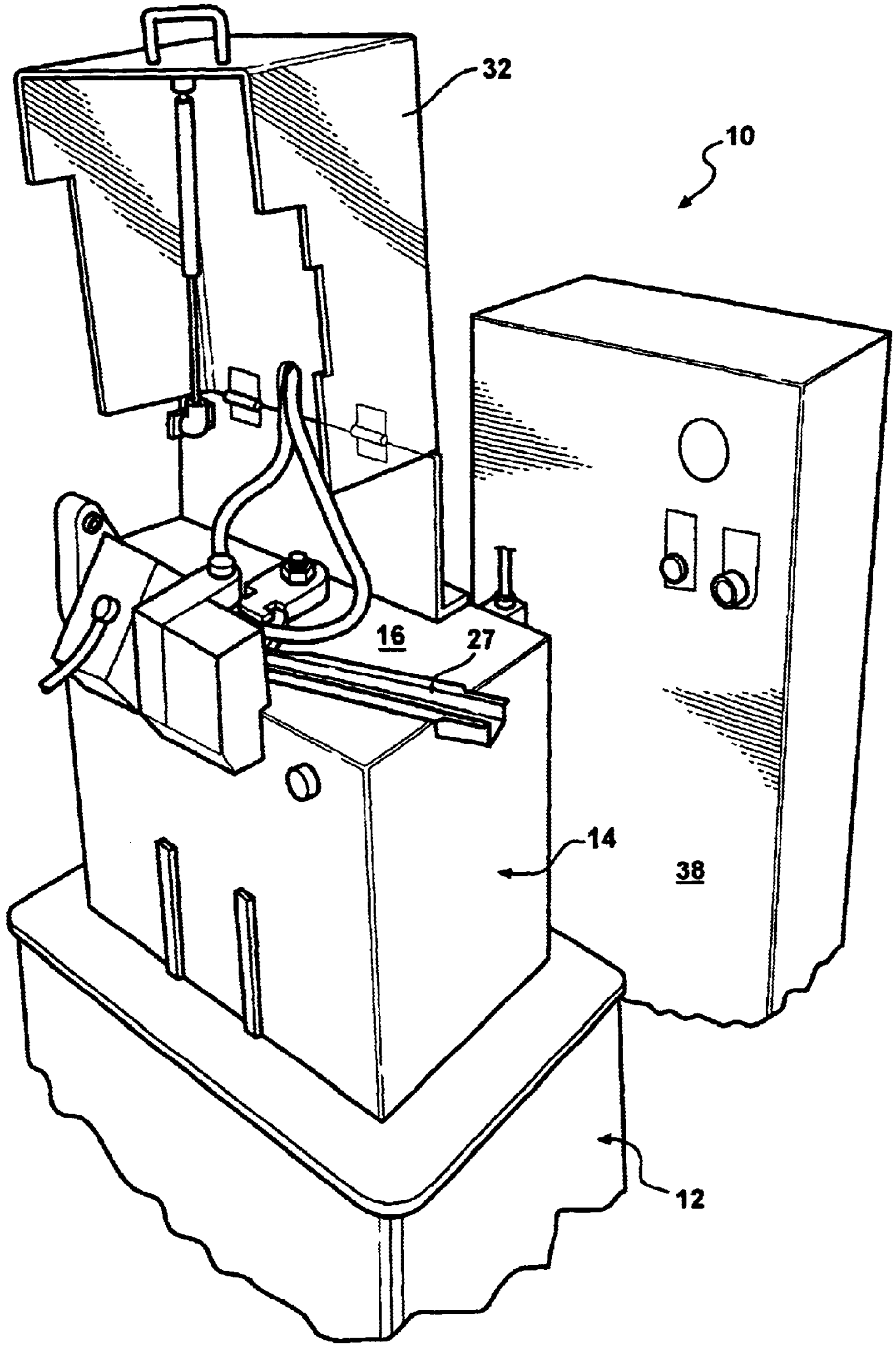
FIG. 1 is a perspective view of a variable speed powder compacting press according to the present invention with a safety cover in an open position.
Figure 2:
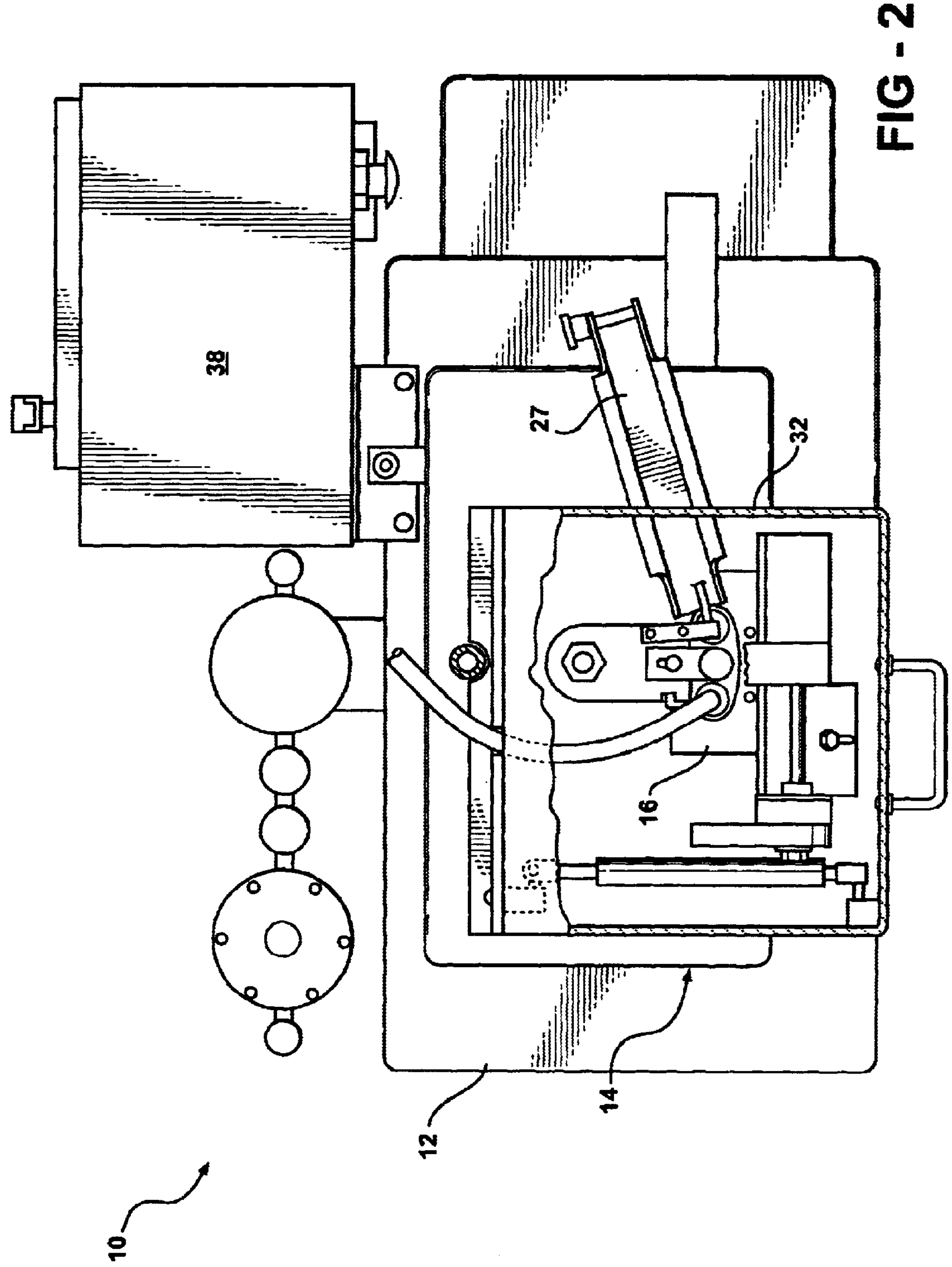
FIG. 2 is a top view of the press of FIG. 1 with the safety cover closed and partly cut away in order to show the sliding anvil.

Referring to FIGS. 1–3, a first embodiment of a powder compacting press with a variable frequency drive is generally shown at 10. FIG. 1 shows a perspective view of the press 10, while FIG. 2 shows a top view and FIG. 3 shows a side view. The press 10 includes a pedestal 12 which houses the electric drive motor, not shown. The motor is shown schematically as "Rotary Drive" in FIG. 6. The press body 14 sits atop the pedestal 12 and encloses a shaft with rotational cams that drive the various operating portions of the press. The press body includes a table 16 with a sliding anvil disposed atop the table 16.

Referring to FIG. 4, the sliding anvil 18 is illustrated in more detail. The anvil 18 has a central compacting portion 20, a powder dispensing portion 24, and a pick up portion 22. The anvil 18 moves as shown by arrow A such that the portions 20–24 are alternately disposed above the cavity 19 in the table 16. The anvil has one end 25 that is pivotally interconnected with the table. The other end includes the compacting portion, dispensing portion, and pick-up portion. When the powder dispensing portion 24 is above the cavity, powder flows down from a feed tube 28 into the cavity 19. The anvil 18 then rotates such that the compacting portion 20 is above the cavity. At this point, a punch 21 disposed in and defining the lower end of the cavity moves upwardly in order to compact the powder in the cavity against the underside of the compacting portion 20. The anvil 18 then moves such that the pick up portion 22 is above the cavity 19 and the compacted product is removed such as by a suction hose 26. The pick up portion 22 may lift the compacted object and move it over to an output tray or conveyor 27 which moves the finished objects to the side of the press where they may be unloaded. Other removal means will be clear to those of skill in the art. This comprises one press operation cycle or stroke. The process is then repeated. The press may alternatively have multiple cavities and multiple punches to make multiple items during each cycle.

Referring again to FIGS. 1–3, a safety cover is generally shown at 32. As shown, the safety cover 32, when closed, covers a portion of the table 16 and the anvil 18. It also covers clamping member 30. When the cover is in the closed position, as shown in FIGS. 2 and 3, the moving portions of the press are covered to prevent an operator from coming in contact with the various components. When the cover 32 is in the open position, as shown in FIG. 1, the various movable components of the press are accessible. An interlock, not shown, senses whether the cover is in the closed position or not. As described later, the interlock is used to determine whether or not the press will run. Other safety interlocks are preferably also provided.

Referring again to FIG. 3, a clamping member 30 is shown positioned above the anvil 18. This clamping member 30 reciprocates so as to press down on the top of the compacting portion 20 when the anvil is in a position such that the compacting portion 20 is above the cavity. This assures a tight seal between the bottom of the compacting portion and the cavity. The movement of the clamping member 30, the anvil 18, the punch, and other components of the press are all mechanically driven by the electric motor, or rotary drive, disposed in the pedestal 12. The rotary drive may take several forms. In a preferred version, the drive motor has a drive belt which drives a cam shaft. The cam shaft, in turn, drives the components of the press. As known to those of skill in the art, during set up and use of a compacting press, it is desirable to slowly and precisely control the movement of the cam shaft and the press components. For this purpose, and according to the present invention, a variable frequency drive is used to control rotation of the cam shaft. The variable frequency drive includes an electric motor, which is controlled by a variable frequency drive controller enclosed in a control box 38 shown in FIGS. 1–3. According to one embodiment of the present invention, the variable frequency drive is provided by Warner, though other sources may be used.

The variable frequency drive allows very precise control of the rotation of the cam shaft. For example, the control includes a slow speed, or "jog" speed, which allows a user to inch the press forwardly and backwardly through its motion. A "setup" mode allows the machine to be run with the top cover 32 up for setting up the machine. Preferably, the interlock, or another interlock, monitors a front cover. The front cover may also be left open in the setup mode. The software in the control has been modified such that in setup mode the machine will only run at jog speed. Otherwise, the machine could be run at full speed, presenting safety concerns. The variable frequency drive controls the speed of the motor by changing the frequency of the signal sent to the motor. This allows the motor to run at any of a variety of speeds, as well as to be moved in small increments both forwardly and backwardly in setup mode. As is known to those of skill in the art, different types of press operations work better at different speeds. The variable frequency drive allows the press to be run at any speed within its designed range.

The combination of the variable frequency drive and the powder compacting press provides significant advantages. The variable frequency drive reduces the need for a hand crank to be used during set up and use of the press. In some embodiments, a removable hand crank is still provided for use by operators accustomed to hand cranks, or for use prior to motor installation and without power. An interlock prevents motorized operation of the press with the hand crank in place. The variable frequency drive allows an operator to safely and accurately move the motor to a set position to set up the press. In addition, the press may be initially run at a very slow speed to allow the operator to watch the operation to make sure that everything is operating properly. The speed may then be increased to a true operating speed. Also, the variable frequency drive avoids laborious changes in the drive mechanism previously required to change the speed of the press. Traditionally, to change the speed of the press required significant manipulation of the drive means and was required to be performed with the press running. This could present problems. For example, if a high speed process was performed and then the tooling was changed for an operation best performed at low speed, it was necessary to start the new operation at high speed so that the speed change could be made. This initial high speed could damage the new tooling. Also, the variable frequency drive is much simpler than the drive mechanism it replaces.

Figure 5:
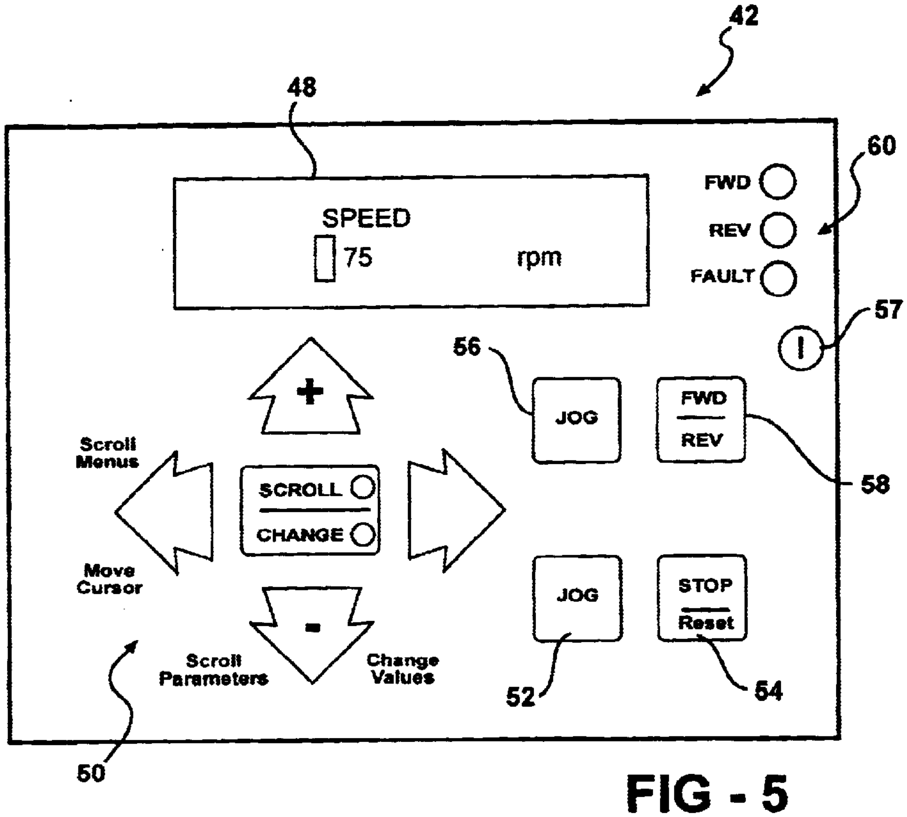
FIG. 5 is a front view of the sample control panel for controlling the variable frequency drive controller that forms part of the present invention.
Figure 6:
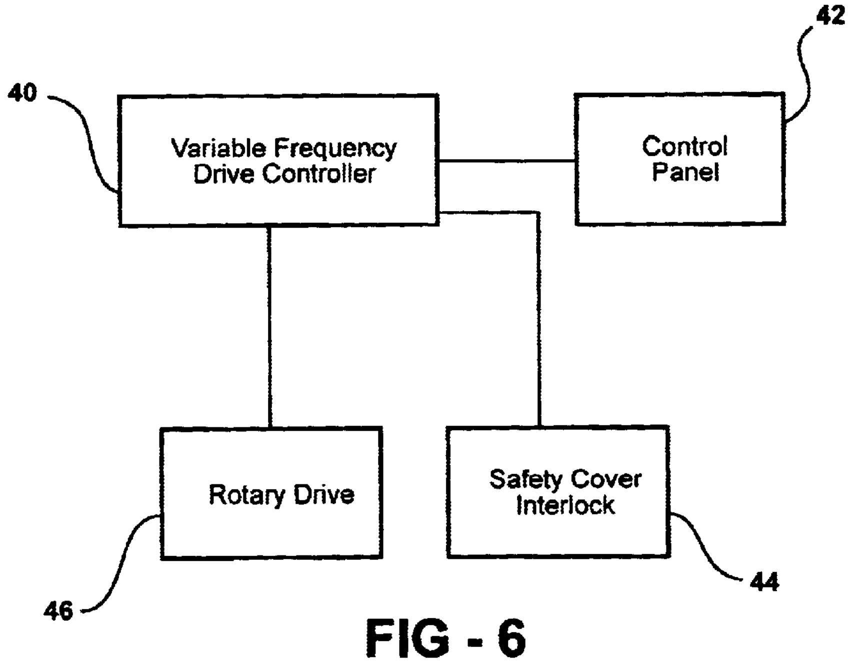
FIG. 6 is a schematic view showing the interrelationship between the drive controller, rotary drive, control panel, and interlock.

The detailed operation of a preferred embodiment of the present invention will now be described with reference to FIGS. 5 and 6. FIG. 6 schematically shows the interaction between the variable frequency drive controller 40, a control panel 42, the safety cover interlock 44, and the rotary drive 46. The operator uses the control panel 42 to control the mode and functions of the variable frequency drive controller 40. The variable drive controller 40 communicates with the interlock 44 to determine whether the safety cover 32 is open or closed. Other safety interlocks, for other safety features, also communicate with the controller. Based on these inputs, the variable frequency drive controller 40 controls the rotary speed of the rotary drive 46. FIG. 5 shows an example of one control panel 42 that may be used. The control panel 42 includes a display 48 for displaying data such as the operating speed of the rotary drive. A variety of parameter control buttons are generally shown at 50. These buttons may be used to control a variety of parameters, such as operating speed of the rotary drive. Therefore, they may be considered a speed control. Also provided are a run control 52, a stop button 54, a mode control 57, a job button 56, and a direction control 58. The mode control 57 is shown as a key switch in FIG. 5 and the direction control button 58 is labeled as "FWD/REV". The key switch may be located elsewhere and the control panel may be arranged differently.

In one preferred embodiment of the present invention, the mode control 57 is used to choose either a set up mode or a run mode. The set up mode may also be referred to as a JOG mode. In the run mode, the variable frequency drive controller 40 runs the rotary drive 46 at the speed set by the parameter control buttons 50. However, the variable frequency drive controller 40 only allows the rotary drive to run if the safety cover interlock 44 indicates that the safety cover is closed. Other interlocks must also indicate that other features are in place. The drive controller 40 begins running the rotary drive 46 when the operator presses the run control or button 52. The drive controller 40 stops the rotary drive 46 if the operator presses the stop button 54 or opens the safety cover thereby tripping the safety cover interlock 44. The direction control is preferably inoperable such that reverse operation is not possible in the run mode. The run mode is used for producing parts using the press and allows the press to be run at a variety of speeds. The speeds at which the drive controller will run the rotary drive 46 in the run mode may be referred to as a "first range of speeds". The range of speeds partially depends on the depth of fill in the cavity. In one embodiment, for example, the range of speeds for 0.300 inch fill is 28–150 operation cycles or strokes per minute, while the range is 28–120 cycles or strokes per minute for 0.600 inch fill. It should be noted that the cycles or strokes per minute referred to in this section of the application refer to cycles or strokes of the press and not to rotations of the rotary drive. For example, a belt between the cam shaft and the drive may change the relative speeds so that the motor runs at a different speed than the cam shaft. Other ranges of speeds may be provided depending on particular rotary drive and the operating conditions. For example, with an alternative assembly (belts and pulleys), the minimum cycle speed is 18 cycles per minute. However, in each case, the ranges of speeds preferably have a lower limit below which the rotary drive is not run in the run mode so as to avoid overheating of the rotary drive.

In the set up or jog mode, the variable frequency drive controller 40 operates differently. The set up or jog mode is chosen by the operator using the mode control 57. On the display panel 55, this requires turning the key switch. In the setup mode, the variable frequency drive controller rotates the rotary drive 46 at a speed lower than the first range of speeds previously discussed when the operator depresses the run control button 52. However, rotation of the rotary drive 46 continues only when the run control button 52 is depressed. If the operator releases the button, the rotation stops. The direction control 58 is operable to change the direction of rotation of the rotary drive in the set up mode. Indicator lights 60 indicate the direction of rotation. Preferably, if the drive is rotating one direction and the operator presses the direction control 58, the drive slows to a stop and then begins turning in the opposite direction, though it should be noted that this reverse operation is available only at jog speed. Also, the variable frequency drive controller 40 allows the safety cover to be open while in setup mode. That is, the safety cover interlock 44 can indicate that the cover is closed or not closed and the drive controller will allow operation of the press at the slow jog speed. The same preferably applies to a front cover. The front cover may also be open while in setup mode. In one preferred embodiment, the jog speed is set at 5 cycles per minute. The operator may accurately control the movement of the rotary drive 46 by tapping or bumping the run control 52. This is referred to as "jogging" the press.

The press also preferably can be run at jog speed while in the run mode. The jog button 56 is used to switch the press from the normal operating speed to the jog speed while in the run mode. The press may then be run at jog speed by pressing the run button. This operation differs from the setup mode in that the safety cover cannot be opened. In order to open the safety cover while operating the press, the control must be placed in the setup mode using the switch 57. Placing the press in the setup mode forces it to run at jog speed as well.

As will be clear to those of skill in the art, the presently discussed variable speed press is just a preferred embodiment of the present invention. Those of skill in the art will be aware of alternatives which do not depart from the spirit or teaching of the present invention. It is the following claims, including all equivalents, which define the scope of the invention.

We claim:

1. A variable speed powder compacting press comprising:

a generally horizontal table with a powder compacting die cavity defined therein, the cavity having an upwardly facing opening;

a movable compacting punch disposed in the die cavity and operable to move upwardly toward the cavity opening to compact powder disposed in the cavity;

a sliding anvil disposed on the horizontal table and having a powder dispensing portion, a compacting portion, and a pickup portion, the anvil being movable between a filling position wherein the dispensing portion is above the cavity, a compacting position wherein the compacting portion is above the cavity, and a pickup position wherein the pickup portion is above the cavity;

a rotary drive operable to move the compacting punch and the sliding anvil in a coordinated manner;

a safety cover configured to cover a portion of the table and the sliding anvil during operation of the machine;

an interlock operable to determine if the safety cover is in a closed position;

a variable frequency drive controller operable to control the rotational speed of the rotary drive, the drive control being in communication with the interlock, the drive control having a control panel including a mode control, a run control, a direction control, and a speed control, the drive control having a run mode and a setup mode that are selectable using the mode control;

when the drive control is in the run mode;

the run control is operable to cause the rotary drive to continuously rotate at a rotational speed in a first range of speeds only when the interlock indicates that the safety cover is closed, the run control requiring only a single manipulation to cause continuous rotation; and the speed control is operable to increase or decrease the rotational speed of the rotary drive within the first range of speeds; and when the drive control is in the setup mode;

the run control is operable to cause the rotary drive to rotate at a second speed less than the first range of speeds only while the run control is manipulated and to cause the rotary drive to stop when the run control is released such that the rotary drive may be jogged, the run control being operable to cause rotation of the rotary drive when the interlock indicates that the safety cover is closed and also when the interlock does not indicate that the safety cover is closed;

the direction control is operable to control the direction of rotation of the rotary drive.

2. The variable speed powder compacting press according to claim 1, wherein the press has an operation cycle including one upward movement of the compacting punch in the die cavity, the first range of speeds having a minimum corresponding to 28 operation cycles per minute, and the second speed corresponding to approximately 5 operation cycles per minute.

3. The variable speed powder compacting press according to claim 1, wherein the press has an operation cycle including one upward movement of the compacting punch in the die cavity, the first range of speeds having a minimum corresponding to 18 operation cycles per minute, and the second speed corresponding to approximately 5 operation cycles per minute.

4. The variable speed powder compacting press according to claim 1, wherein the press includes multiple cavities and multiple compacting punches.

5. The variable speed powder compacting press according to claim 1, wherein the sliding anvil has a first end pivotally interconnected with the table and a second end comprising the powder dispensing portion, the compacting portion, and the pickup portion, the second end pivoting about the first end to move the anvil between the dispensing, compacting, and pickup positions.

6. The variable speed powder compacting press according to claim 1, wherein when the drive control is in the run mode, the direction control is not operable and the rotary drive runs only in a forwardly direction.

7. The variable speed powder compacting press according to claim 1, wherein when the drive control is in the setup mode, the speed control is not operable and the rotary drive runs at a constant speed while the run control is manipulated.

8. The variable speed powder compacting press according to claim 1, further comprising:

a second safety cover configured to cover the front portion of the press and a second interlock operable to determine if the second safety cover is in the closed position;

when the drive motor is in the run mode;

the run control being operable to cause the rotary drive to continuously rotate at a rotational speed in a first range of speeds only when the second interlock indicates that the safety cover is closed; and when the drive control is in the setup mode;

the run control being operable to cause the rotary drive to rotate at the second speed when the second interlock indicates that the second safety cover is closed and also when the second interlock does not indicate that the second safety cover is closed.

9. The variable speed powder compacting press according to claim 1, further comprising a jog button, wherein when the drive control is in the run mode;

the jog button is operable to cause the rotary drive to rotate at the second speed when the run control is manipulated and to stop the rotary drive when the run control is released.

* * * * *